United States Patent
Nakamura et al.

(10) Patent No.: US 12,320,725 B2
(45) Date of Patent: Jun. 3, 2025

(54) SEVERAL MODE FIBER TEST METHOD AND SEVERAL MODE FIBER TEST DEVICE

(71) Applicant: NIPPON TELEGRAPH AND TELEPHONE CORPORATION, Tokyo (JP)

(72) Inventors: Atsushi Nakamura, Musashino (JP); Tomokazu Oda, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 184 days.

(21) Appl. No.: 18/020,982

(22) PCT Filed: Aug. 21, 2020

(86) PCT No.: PCT/JP2020/031614
§ 371 (c)(1),
(2) Date: Feb. 13, 2023

(87) PCT Pub. No.: WO2022/038768
PCT Pub. Date: Feb. 24, 2022

(65) Prior Publication Data
US 2023/0288289 A1 Sep. 14, 2023

(51) Int. Cl.
*G01M 11/00* (2006.01)
*G01M 11/02* (2006.01)

(52) U.S. Cl.
CPC ...... *G01M 11/332* (2013.01); *G01M 11/0207* (2013.01)

(58) Field of Classification Search
CPC ........... G01M 11/332; G01M 11/0207; G01M 11/3145

(Continued)

(56) References Cited

U.S. PATENT DOCUMENTS 5,323,224 A * 6/1994 Wada .................. G01M 11/319
356/73.1

OTHER PUBLICATIONS

T. Oda et al., "Modal attenuation measurement in spliced few mode fibre based on inter-modal Brillouin gain analysis", in Proceedings of the 44th European Conference on Optical Communication, PaperWe2.7, 2018.

(Continued)

*Primary Examiner* — Md M Rahman
(74) *Attorney, Agent, or Firm* — Harness, Dickey & Pierce, P.L.C.

(57) ABSTRACT

An object of the present disclosure is to provide a few-mode fiber testing method and a few-mode fiber testing device capable of acquiring a loss and inter-mode crosstalk for each mode at a connection point of a few-mode fiber by measurement only from one end of FUT. The few-mode fiber testing method according to the present disclosure includes receiving a test light pulse in a basic mode from one end of an optical fiber under test that is connected in series with few-mode fibers of the same type, measuring an intensity distribution relating to a distance from the one end of backward Brillouin scattering light generated by receiving a test light pulse, obtaining a transmittance of the backward Brillouin scattering light at a connection point of the optical fiber under test from the measured intensity distribution, and calculating a connection loss of the basic mode from the transmittance, calculating a ratio of an axial deviation amount to a mode field radius of the optical fiber under test at the connection point from the calculated connection loss, and calculating a connection loss of a higher-order mode and inter-mode crosstalk between different modes from the calculated ratio.

5 Claims, 3 Drawing Sheets

(58) Field of Classification Search
USPC .................................................... 356/73.1
See application file for complete search history.

(56) References Cited

OTHER PUBLICATIONS

T. Oda et al., "Measurement of modal attenuation and crosstalk in spliced few-mode fibres based on mode-resolved BOTDA", in Proceedings of the 45th European Conference on Optical Communication, Paper P36, 2019.

A. Nakamura et al., "A method for estimating loss and crosstalk at a splice point in two-mode fibers from OTDR waveforms", in Proceedings of the 5th International Symposium on EXAT, P-01, 2019.

* cited by examiner

SEVERAL MODE FIBER TEST METHOD AND SEVERAL MODE FIBER TEST DEVICE

CROSS-REFERENCE TO RELATED APPLICATIONS

This application is a 371 U.S. National Phase of International Application No. PCT/JP2020/031614, filed on Aug. 21, 2020. The entire disclosure of the above application is incorporated herein by reference.

TECHNICAL FIELD

The present invention relates to a testing method and a testing device for measuring loss and inter-mode crosstalk for each mode in a few-mode fiber.

BACKGROUND ART

Due to the spread of various Internet services, the amount of traffic flowing through one optical fiber has rapidly increased year by year. On the other hand, the transmission capacity that can be propagated through the optical fiber is limited, and it is predicted that a single-mode fiber (SMF), which is widely used at present, will not be able to cope with future traffic increases. As one technique for overcoming this situation, mode multiplex transmission using few-mode fibers has been attracting attention. In the present technology, mode dependent loss and inter-mode crosstalk occurring at a connection point of few-mode fibers are one of factors for limiting the transmission capacity. Therefore, in a case where a transmission line is constructed by connecting a plurality of few-mode fibers, a technique for testing whether or not the mode dependent loss and inter-mode crosstalk occurring at the connection point are appropriate values is important.

As one of the optical fiber testing methods, there is "Brillouin Optical Time Domain Analysis" (hereinafter abbreviated as "BOTDA"). In the BOTDA, pulsed light is incident as pump light from one end of the optical fiber under test (hereinafter, "fiber under test" is abbreviated as "FUT"), and continuous light is incident as probe light from the other end. In addition, the probe light may be pulse light. At this time, when the optical frequencies of the pump light and the probe light are set to values within the Brillouin frequency shift band, the probe light is amplified or attenuated through induced Brillouin scattering when the pump light and the probe light collide with each other. Hereinafter, the case of amplification will be described as an example. The time response waveform of the amplified probe light intensity is called a Brillouin gain distribution, and loss distribution or the like in the optical fiber can be obtained from the Brillouin gain distribution. NPL 1 and NPL 2 disclose methods using Brillouin gain analysis as methods of testing loss and crosstalk for each mode occurring at the connection point of few-mode fibers.

CITATION LIST

Non Patent Literature

[NPL 1] T. ODA et al., "Modal attenuation measurement in spliced few mode fibre based on inter-modal Brillouin gain analysis," in Proceedings of the 44th European Conference on Optical Communication, Paper We2.7, 2018

[NPL 2] T. Oda et al., "Measurement of modal attenuation and crosstalk in spliced few-mode fibres based on mode-resolved BOTDA," in Proceedings of the 45th European Conference on Optical Communication, Paper P 36, 2019.

[NPL 3] A. Nakamura et al., "A method for estimating loss and crosstalk at a splice point in two-mode fibers from OTDR waveforms," in Proceedings of the 5th International Symposium on EXAT, P-01, 2019.

SUMMARY OF INVENTION

Technical Problem

However, in the technique of the related art, since it is necessary to perform measurement from both ends of the FUT, the measurement cannot be easily performed in a case where both ends of the FUT are located at a remote place.

In order to solve the above problem, an object of the present invention is to provide a few-mode fiber testing method and a few-mode fiber testing device capable of acquiring loss and inter-mode crosstalk for each mode at a connection point of a few-mode fiber by measurement only from one end of the FUT.

Solution to Problem

In order to achieve the above-mentioned object, in the few-mode fiber testing method and the few-mode fiber testing device according to the present invention, a transmittance is measured from one end of the FUT by Brillouin Optical Time Domain Reflectometry (hereinafter, abbreviated as "BOTDR"), and the loss for each mode of the FUT and the inter-mode crosstalk are acquired by calculation.

Specifically, a few-mode fiber testing method according to the present disclosure includes inputting a test light pulse in a basic mode to one end of an optical fiber under test that is connected in series with few-mode fibers of the same type, measuring an intensity distribution relating to a distance from the one end of backward Brillouin scattering light generated by the test light pulse, obtaining a transmittance of the backward Brillouin scattering light at a connection point of the optical fiber under test from the measured intensity distribution, calculating a connection loss of the basic mode from the transmittance, calculating a ratio of an axial deviation amount to a mode field radius of the optical fiber under test at the connection point from the calculated connection loss, and calculating a connection loss of a higher-order mode and inter-mode crosstalk between different modes from the calculated ratio.

For example, in the few-mode fiber testing method according to the present disclosure, when measuring the intensity distribution, a Brillouin frequency shift in which a Brillouin gain coefficient between the basic modes becomes larger than the other Brillouin gain coefficients may be used.

For example, in the few-mode fiber testing method according to the present disclosure, when calculating the ratio, the ratio mat be expressed as d/w, the square root of the transmittance obtained from the measured intensity distribution may be substituted into the left side of an approximate expression (C1) of a coupling efficiency $\eta_{11}$ between the basic modes at the connection point obtained by approximating an electric field distribution of the basic modes by a Gaussian function, and the ratio d/w may be calculated.

[Math. C1]

$$\eta_{11} = \exp\left(-\frac{d^2}{w^2}\right) \quad (C1)$$

For example, in the few-mode fiber testing method according to the present disclosure, after calculating the ratio d/w, by substituting the ratio d/w into an approximate expression (C3) of a coupling efficiency $\eta_{22}$ between the higher-order modes at the connection point obtained by approximating the electric field distribution of the higher-order mode with a higher-order Gaussian function and an approximate expression (C2) of coupling efficiencies $\eta_{12}$ and $\eta_{21}$ between the basic mode and the higher-order mode, the connection loss $\eta_{22}$ in the higher-order mode and inter-mode crosstalk $\eta_{12}$ and $\eta_{21}$ between different modes may be calculated.

[Math. C2]

$$\eta_{12} = \eta_{21} = \frac{d^2}{w^2}\exp\left(-\frac{d^2}{w^2}\right) \quad (C2)$$

[Math. C3]

$$\eta_{22} = \left(1 - \frac{d^2}{w^2} + \frac{1}{2}\frac{d^4}{w^4}\right)\exp\left(-\frac{d^2}{w^2}\right) \quad (C3)$$

Specifically, a few-mode fiber testing device according to the present disclosure includes a test light input unit that is connected to one end of an optical fiber under test in which few-mode fibers of the same kind are connected in series and which inputs a test light pulse from the one end in a basic mode, a measurement unit that measures an intensity distribution related to a distance from the one end of backward Brillouin scattering light generated by the test light pulse, a first calculation unit that obtains a transmittance of the backward Brillouin scattering light at a connection point of the optical fiber under test from the intensity distribution measured by the measurement unit, and calculates a connection loss of the basic mode from the transmittance, a second calculation unit that calculates a ratio of an axial deviation amount to a mode field radius of the optical fiber under test at the connection point from the connection loss calculated by the first calculation unit, and a third calculation unit that calculates a connection loss of a higher-order mode and inter-mode crosstalk between different modes from the ratio calculated by the second calculation unit.

The few-mode fiber testing method and the few-mode fiber testing device according to the present disclosure can acquire a loss and inter-mode crosstalk for each mode at a connection point of the few-mode fiber by measurement only from one end of the FUT by performing a BOTDR test under specific conditions.

It should be noted that the inventions described above can be combined where possible.

Advantageous Effects of Invention

According to the present disclosure, it is possible to provide a few-mode fiber testing method and a few-mode fiber testing device capable of acquiring a loss and inter-mode crosstalk for each mode at a connection point of the few-mode fiber by measurement only from one end of the FUT.

DESCRIPTION OF EMBODIMENTS

Hereinafter, an embodiment of the present disclosure will be described in detail with reference to the drawings. Note that the present disclosure is not limited to the embodiment described below. These implementation examples are only illustrative, and the present disclosure can be implemented in various modified and improved modes based on the knowledge of those skilled in the art. Note that constituent elements with the same reference signs in the specifications and the drawings are identical to each other.

Embodiment

Figure 1:
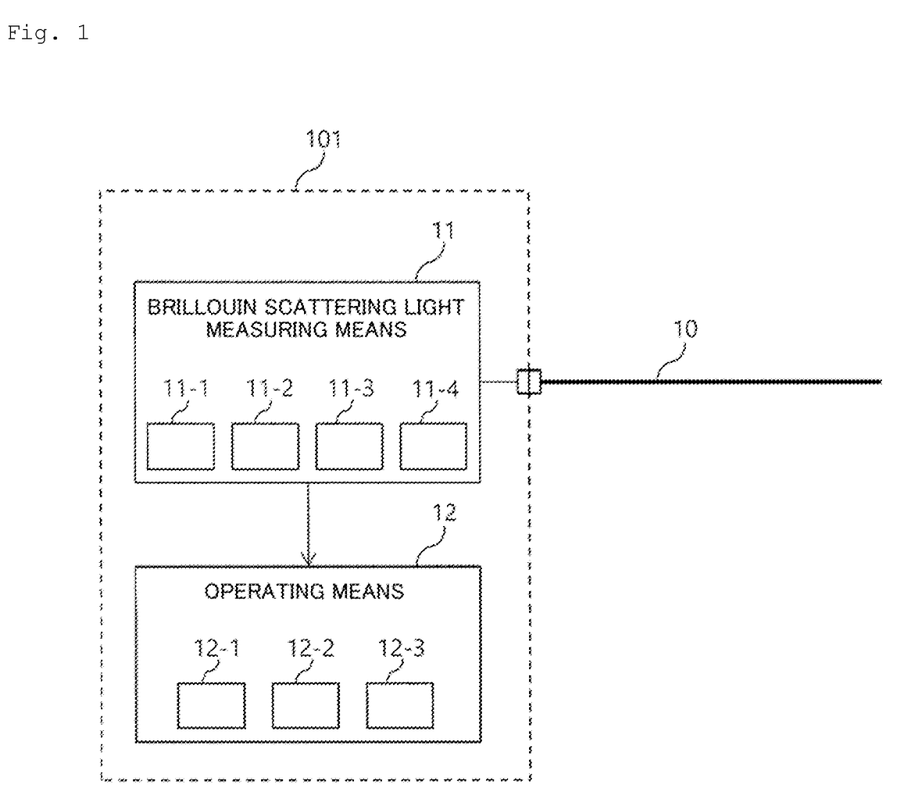
FIG. 1 illustrates an example of a schematic configuration and usage of a few-mode fiber testing device according to the present invention.

FIG. 1 shows an example of a schematic configuration of a few-mode fiber testing device according to the present embodiment. A few-mode fiber testing device 101 includes Brillouin scattering light measuring means 11 and operating means 12.

The Brillouin scattering light measuring means 11 is a general purpose BOTDR device. Specifically, the Brillouin scattering light measuring means 11 includes a test light generating unit 11-1 for generating a test light pulse incident on an optical fiber 10 under test, a test light input unit 11-2 connected to one end of the optical fiber 10 under test in which few-mode fibers of the same kind are connected in series and in which a test light pulse is incident from one end in the basic mode, a photoelectric conversion unit 11-3 for photoelectrically converting a basic mode component of backward Brillouin scattering light generated by the test light pulse made incident by the test light input unit 11-2, and a measurement unit 11-4 for measuring an intensity distribution related to a distance from one end of the generated backward Brillouin scattering light. The Brillouin scattering light measuring means 11 performs steps S01 and S02 of a few-mode fiber testing method that will be described later. The details of each step will be described with reference to the few-mode fiber testing method.

The operating means 12 further includes a first calculation unit 12-1 that obtains the transmittance of the backward Brillouin scattering light at the connection point of the optical fiber under test from the intensity distribution measured by the measurement unit 11-4 and calculates the connection loss in the basic mode from the transmittance, a second calculation unit 12-2 that calculates the ratio of the axial deviation amount to the mode field radius of the optical fiber under test at the connection point from the connection loss calculated by the first calculation unit 12-1, and a third calculation unit 12-3 that calculates the connection loss of a higher-order mode and the crosstalk between different modes from the ratio calculated by the second calculation unit 12-2. The first calculation unit 12-1, the second calculation unit 12-2, and the third calculation unit 12-3 of the operating means 12 perform steps S03-S05 of a few-mode fiber testing method to be described later, respectively. The details of each step will be described with reference to the few-mode fiber testing method.

Note that the operating means 12 can also be realized by a computer and a program, the program can also be recorded in a recording medium, and the program can also be provided through a network.

Figure 2:
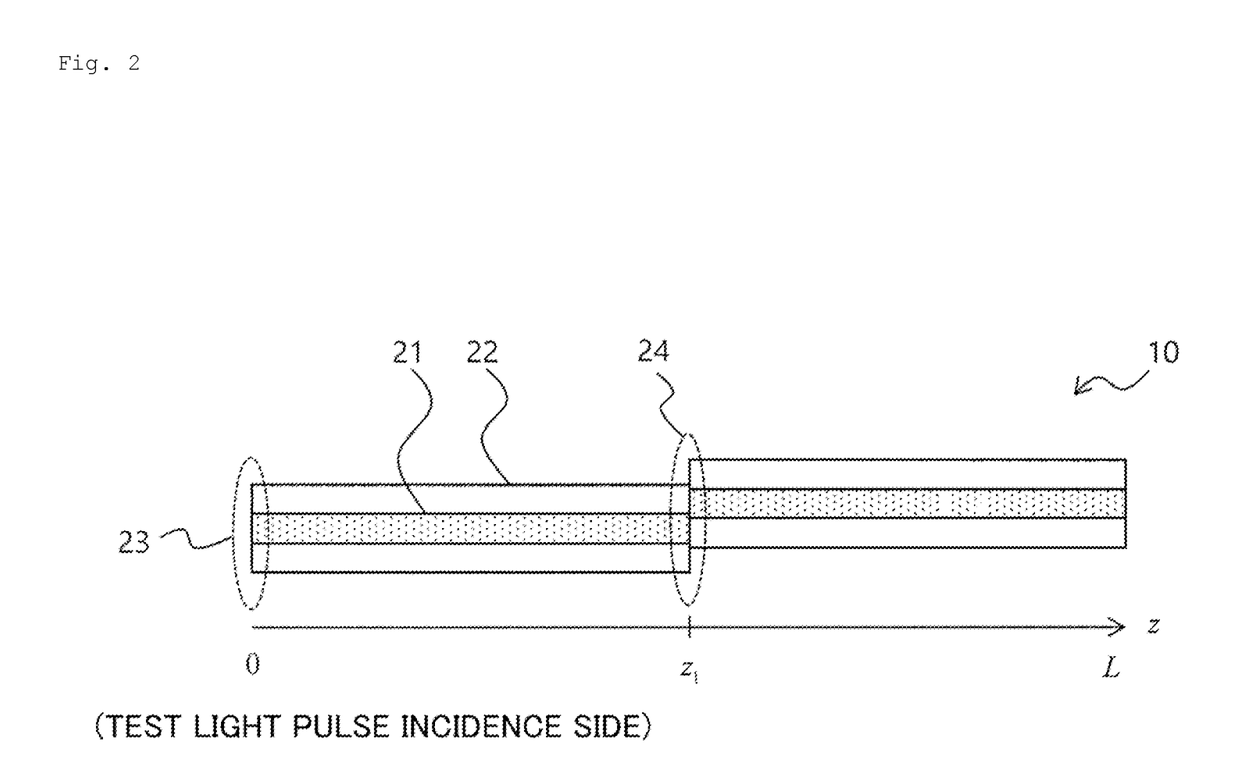
FIG. 2 illustrates an example of a schematic configuration of an optical fiber under test according to the present invention.

The schematic configuration of the optical fiber 10 under test will be described with reference to FIG. 2. The optical fiber 10 under test according to the present embodiment is composed of two types of few-mode fibers of the same kind, and has one connection point 24 in the entire length L. Hereinafter, in the optical fiber 10 under test, the distance in the long axis direction from one end 23 on the side where the test light pulse is incident (hereinafter, "one end 23 on the incident side" is simply called "incidence end 23") is defined as z and the distance of the connection point 24 is defined as $z_1$. The distance of the connection point 24 in the long axis direction from the center of the connection point 24 is defined as z, and the distance of the connection point 24 is defined as $z_1$. The distance between the incidence end 23 and the opposite side end is defined as L. In the present embodiment, a case where two linear polarization modes can propagate through the optical fiber under test is considered as an example.

In the following description, the transmittance is defined as T, the axial deviation amount occurring at the connection point 24 is defined as d, and the mode field radius is defined as w. The inter-mode coupling efficiency at the connection point is defined as $\eta_{ij}$. The subscripts i and j (i, j=1, 2) represent propagation modes, "1" represents a basic mode (LP01 mode), and "2" represents a first higher-order mode (LP11 mode). Specifically, $\eta_{11}$ is the coupling efficiency between the basic modes, $\eta_{12}$ and $\eta_{21}$ are the coupling efficiency between the basic mode and the first higher-order mode, and $\eta_{22}$ is the coupling efficiency between the first higher-order modes. The loss coefficients of the basic mode and the first higher-order mode in the optical fiber under test are equal, and they are defined as $\alpha$. Further, the Brillouin gain coefficient when the test light in the mode i generates the backward Brillouin scattering light in the mode j is defined as $g_{ij}(\nu)$ as a function of a Brillouin frequency shift $\nu$.

In the present embodiment, two preconditions are set. As a premise 1, it is assumed that "in the Brillouin frequency shift $\nu$ to be measured, $g_{11}(\nu)$ is sufficiently larger than $g_{12}(\nu)$, $g_{21}(\nu)$ and $g_{22}(\nu)$". In actual measurement, since the amount of frequency shift to be analyzed can be arbitrarily set, it is possible to satisfy the premise 1 if the analysis is performed with the amount of frequency shift satisfying the condition. Therefore, when the intensity distribution is measured, the Brillouin frequency shift $\nu$ is used in which the Brillouin gain coefficient $g_{11}(\nu)$ of the basic modes becomes larger than other Brillouin gain coefficients.

As a premise 2, it is assumed that "an axial deviation amount d generated at a connection point is small with respect to a mode field radius w". If appropriate construction is performed on the optical fiber, the axial deviation amount d is smaller than the mode field radius w, so that it is appropriate.

Figure 3:
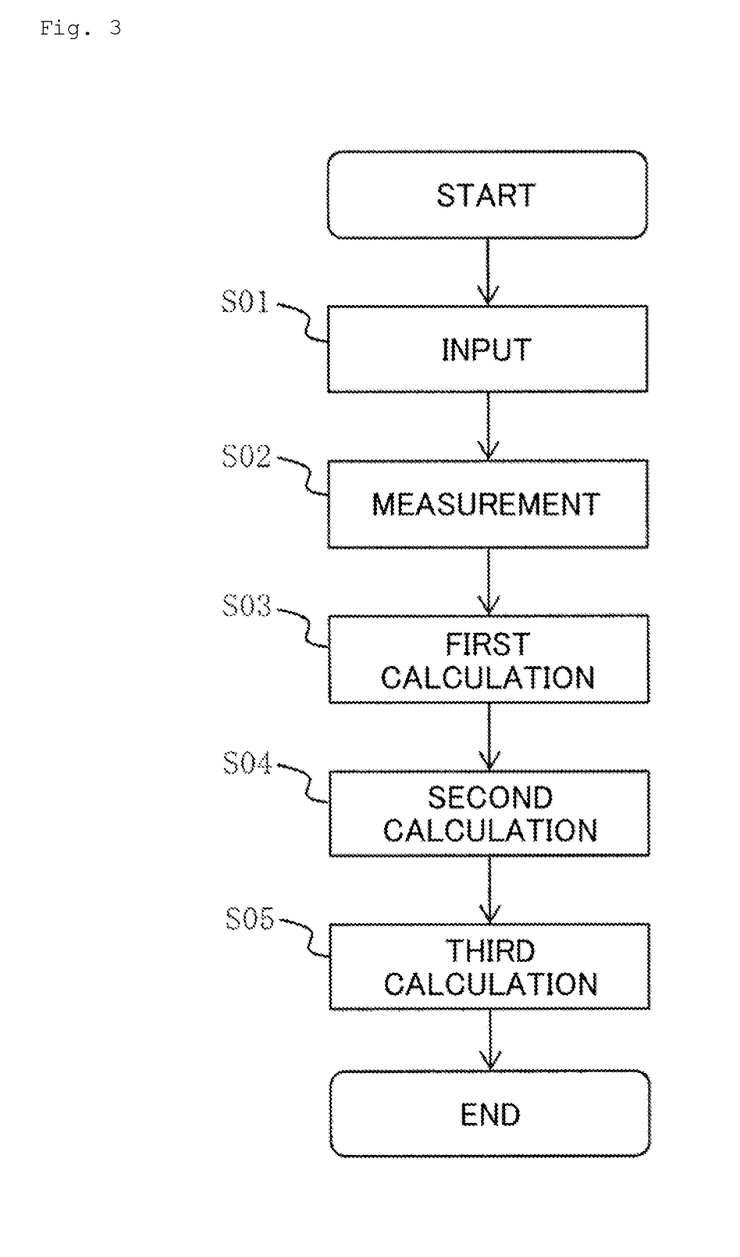
FIG. 3 illustrates an example of a flow chart in a few-mode fiber testing method according to the present invention.

FIG. 3 shows an example of a flow chart of the few-mode fiber testing method according to the present embodiment. The few-mode fiber testing method according to the present embodiment includes an input step S01 of inputting a test light pulse in a basic mode from the incidence end 23 which is one end of the optical fiber 10 under test in which the same kind of few-mode fibers are connected in series, a measurement step S02 of measuring the intensity distribution relating to the distance from the incidence end 23 of backward Brillouin scattering light generated by receiving a test light pulse, a first calculation step S03 of obtaining a transmittance T of the backward Brillouin scattering light at the connection point 24 of the optical fiber 10 under test from the measured intensity distribution and calculating a connection loss of the basic mode from the transmittance T, a second calculation step S04 of calculating a ratio d/w of an axial deviation amount d to a mode field radius w of the optical fiber 10 under test at the connection point 24 from the calculated connection loss, and a third calculation step S05 of calculating a connection loss of a higher-order mode and inter-mode crosstalk between different modes from the calculated ratio d/w. The steps S01 to S05 will be described in detail below.

(Step S01)

The test light generating unit 11-1 generates a test light pulse incident on the optical fiber 10 under test. The test light input unit 11-2 inputs a test light pulse from the incidence end 23 of the optical fiber 10 under test in the basic mode.

(Step S02)

The photoelectric conversion unit 11-3 photoelectrically converts a basic mode component of the backward Brillouin scattering light generated by the test light pulse input by the test light input unit 11-2. The measurement unit 11-4 measures the intensity distribution relating to the distance from the incidence end 23 of the basic mode component of the generated backward Brillouin scattering light.

(Step S03)

In the present embodiment, the intensity distribution of the backward Brillouin scattering light is divided into two with the connection point 24 as a boundary. In the mode i, the intensity distribution before the connection point on the incidence end 23 side from the connection point 24 is expressed as $P_{bi}(z|z<z_1)$ and the intensity distribution after the connection point on the side farther from the connection point 24 is expressed as $P_{bi}(z|z>z_1)$. The first calculation unit 12-1 extracts the intensity distribution before the connection point and the intensity distribution after the connection point from the intensity distribution of the basic mode component of the backward Brillouin scattering light measured by the measurement unit 11-4. Then, in each of the intensity distribution before the connection point and the intensity distribution after the connection point, a distance $z_1$ of the connection point 24 is substituted into z to obtain the intensities $P_{b1}(z|z>z_1)$ and $P_{b1}(z|z<z_1)$ at the connection point 24. The ratio of $P_{b1}(z_1|z>z_1)$ to $P_{b1}(z_1|z<z_1)$ is the transmittance T of the backward Brillouin scattering light intensity around the connection point 24. The connection loss Loss (LP01) in the basic mode is obtained by substituting the transmittance T into Equation 1.

[Math. 1]

$$\text{Loss}(LP01) = 5 \log[T(\nu)]$$

Here, the validity of Equation 1 will be described. In the step S01, a case in which the test light pulse of the basic mode having the intensity of $P_0$ is input is considered. In this case, for the test light intensities $P_1(z)$ (LP01 mode) and $P_2(z)$ (LP11 mode) of the basic mode and the first higher-order mode at the distance z, the intensity before the connection point 24 (when $z<z_1$) can be expressed by Equation 2 and the intensity after the connection point 24 (when $z>z_1$) can be expressed by Equation 3.

[Math. 2]
$$\begin{bmatrix} P_1(z) \\ P_2(z) \end{bmatrix} = \begin{bmatrix} \exp(-\alpha z) & 0 \\ 0 & \exp(-\alpha z) \end{bmatrix} \begin{bmatrix} P_0 \\ 0 \end{bmatrix} \quad (2)$$

[Math. 3]
$$\begin{bmatrix} P_1(z) \\ P_2(z) \end{bmatrix} = \begin{bmatrix} \exp[-\alpha(z-z_1)] & 0 \\ 0 & \exp[-\alpha(z-z_1)] \end{bmatrix} \begin{bmatrix} \eta_{11} & \eta_{21} \\ \eta_{12} & \eta_{22} \end{bmatrix} \quad (3)$$
$$\begin{bmatrix} \exp(-\alpha z_1) & 0 \\ 0 & \exp(-\alpha z_1) \end{bmatrix} \begin{bmatrix} P_0 \\ 0 \end{bmatrix}$$

Further, the intensity of the backward Brillouin scattering light generated at the distance z is measured at the test light pulse incidence end. In the Brillouin scattering light intensity distributions $P_{b1}(z)$ and $P_{b2}(z)$ measured as the basic mode (LP01 mode) and the first higher-order mode (LP11 mode), the distribution before the connection point 24 (when $z<z_1$) can be expressed by Equation 4 and the distribution after the connection point 24 (when $z>z_1$) can be expressed by Equation 5. Each component of the left side of Equation 4 is the intensity distribution $P_{bi}(z|z<z_1)$ before the connection point described above, and each component on the left side of Equation 5 is the intensity distribution $P_{bi}(z|z>z_1)$ after the connection point described above.

[Math. 4]
$$\begin{bmatrix} P_{b1}(z) \\ P_{b2}(z) \end{bmatrix} = \begin{bmatrix} \exp(-\alpha z) & 0 \\ 0 & \exp(-\alpha z) \end{bmatrix} \begin{bmatrix} g_{11} & g_{21} \\ g_{12} & g_{22} \end{bmatrix} \begin{bmatrix} P_1(z) \\ P_2(z) \end{bmatrix} \quad (4)$$

[Math. 5]
$$\begin{bmatrix} P_{b1}(z) \\ P_{b2}(z) \end{bmatrix} = \begin{bmatrix} \exp[-\alpha(z-z_1)] & 0 \\ 0 & \exp[-\alpha(z-z_1)] \end{bmatrix} \begin{bmatrix} \eta_{11} & \eta_{21} \\ \eta_{12} & \eta_{22} \end{bmatrix} \quad (5)$$
$$\begin{bmatrix} \exp(-\alpha z_1) & 0 \\ 0 & \exp(-\alpha z_1) \end{bmatrix} \begin{bmatrix} g_{11} & g_{21} \\ g_{12} & g_{22} \end{bmatrix} \begin{bmatrix} P_1(z) \\ P_2(z) \end{bmatrix}$$

The transmittance T of the intensity of backward Brillouin scattering light before and after the connection point can be expressed by Equation 6.

[Math. 6]
$$T = \frac{P_{b1}(z_1 \mid z > z_1)}{P_{b1}(z_1 \mid z < z_1)} = \eta_{11}^2 + \eta_{11}\eta_{12}\frac{g_{21}}{g_{11}} + \eta_{11}\eta_{21}\frac{g_{12}}{g_{11}} + \eta_{12}\eta_{21}\frac{g_{22}}{g_{11}} \quad (6)$$

While the magnitude of the Brillouin gain coefficient $g_{ij}$ greatly depends on the Brillouin frequency shift ν, the coupling efficiency $\eta_{ij}$ hardly changes with a change in the optical frequency of about several GHz. Therefore, in Equation 6, only $g_{ij}$ can be expressed as a function of the Brillouin frequency shift ν as shown in Equation 7.

[Math. 7]
$$T(\nu) = \eta_{11}^2 + \eta_{11}\eta_{12}\frac{g_{21}(\nu)}{g_{11}(\nu)} + \eta_{11}\eta_{21}\frac{g_{12}(\nu)}{g_{11}(\nu)} + \eta_{12}\eta_{21}\frac{g_{22}(\nu)}{g_{11}(\nu)} \quad (7)$$

Therefore, under the premise 1 described above, the transmittance T can be approximated as shown by Equation 8.

[Math. 8]
$$T(\nu) \approx \eta_{11}^2 \quad (8)$$

Therefore, if the premise 1 is satisfied, Equation 8 is appropriate. Equation 8 represents the square of the coupling efficiency of the basic mode (LP01 mode) at the connection point. When the coupling efficiency $\eta_{11}$ between the basic modes is converted into the transmittance T by using Equation 8 for $\eta_{11}$ of the logarithmic scale, Equation 1 representing the connection loss of the basic mode is derived. As described above, in this step, the connection loss of the basic mode can be obtained by using the transmittance T and Equation 1 obtained from the measured intensity distribution.

(Step S04)

In NPL 3, it is disclosed that, when the electric field distributions of the basic mode and the two orthogonal first higher-order modes in the optical fiber are approximated by a Gaussian function and a Hermitian Gaussian function, the coupling efficiency $\eta_{11}$ at the connection point can be approximated by Equation 9. Also in the present embodiment, the coupling efficiency η11 is approximated by Equation 9.

[Math. 9]
$$\eta_{11} = \exp\left(-\frac{d^2}{w^2}\right) \quad (9)$$

When calculating the ratio, the second calculation unit 12-2 represents the ratio d/w, and substitutes the square root of the transmittance T obtained in the step S03 into the left side of Equation 9 which is an approximate expression of coupling efficiency η11 between the basic modes at the connection point 24 obtained by approximating the electric field distribution of the basic modes with a Gaussian function to calculate the ratio d/w. Here, the square root of the transmittance T is used because Equation 8 is satisfied.

(Step S05)

In NPL 3, when the electric field distributions of the basic mode and the two orthogonal first higher-order modes in the optical fiber are approximated by the Gaussian function and a Hermitian Gaussian function, the coupling efficiencies $\eta_{12}$ and $\eta_{21}$ at the connection point can be approximated by Equation 10, and $\eta_{22}$ can be approximated by Equation 11. Also in the present embodiment, the coupling efficiencies $\eta_{12}$ and $\eta_{21}$ are approximated by Equation 10 and 1-122 is approximated by Equation 11.

[Math. 10]
$$\eta_{12} = \eta_{21} = \frac{d^2}{w^2}\exp\left(-\frac{d^2}{w^2}\right) \quad (10)$$

[Math. 11]
$$\eta_{22} = \left(1 - \frac{d^2}{w^2} + \frac{1}{2}\frac{d^4}{w^4}\right)\exp\left(-\frac{d^2}{w^2}\right) \quad (11)$$

After calculating the ratio d/w, the third calculation unit 12-3 substitutes the ratio d/w calculated in step S04 into Equation 11 which is an approximate expression of the coupling efficiency $\eta_{22}$ between the higher-order modes at the connection point 24 obtained by approximating the electric field distribution of the higher-order mode with a higher-order Gaussian function, and into Equation 10 which is an approximate expression of the coupling efficiencies $\eta_{12}$ and $\eta_{21}$ between the basic mode and the higher-order mode to calculate the connection loss $\eta_{22}$ in the higher-order mode and the inter-mode crosstalk $\eta_{12}$ and $\eta_{21}$ between different modes.

In addition, in a case where Equations 9 to 11 are satisfied for each of the coupling efficiencies $\eta_{ij}$, the approximation accuracy of the approximation equation of Equation 8 is further improved according to the premise 2. As a result, the connection loss of the basic mode can be obtained more accurately from the intensity distribution of the backward Brillouin scattering light of the basic mode.

As described above, the few-mode fiber testing method and the few-mode fiber testing device according to the present disclosure can acquire the loss and the inter-mode crosstalk for each mode at the connection point of the few-mode fiber by measurement only from one end of the FUT by performing a BOTDR test under specific conditions.

It should be noted that the inventions described above can be combined where possible.

INDUSTRIAL APPLICABILITY

The few-mode fiber testing method and the few-mode fiber testing device according to the present disclosure can be applied in the information communication industry.

REFERENCE SIGNS LIST

10 Optical fiber under test
11 Brillouin scattering light measuring means
11-1 Test light generating unit
11-2 Test light input unit
11-3 Photoelectric conversion unit
11 Measurement unit
12 Operating means
12-1 First calculation unit
12-2 Second calculation unit
12-3 Third calculation unit
21 Core
22 Clad
23 Incidence end
24 Connection point
101 few-Mode fiber testing device

The invention claimed is:

1. A few-mode testing method comprising:
   inputting a test light pulse in a basic mode to one end of an optical fiber under test that is connected in series with few-mode fibers of the same type by using a Brillouin optical time domain reflectometry device (BOTDR);
   measuring, by the BOTDR, an intensity distribution relating to a distance from the one end of backward Brillouin scattering light of the basic mode generated by the test light pulse;
   calculating, by an operating device, a ratio of an intensity Pb1 of backward Brillouin scattering light at a connection point seen from one end side of the optical fiber under test to an intensity Pb2 of backward Brillouin scattering light at the connection point seen from another end side of the optical fiber under test, and setting the ratio as a transmittance T at the connection point of the few-mode fiber; and
   calculating, by the operating device, a coupling efficiency (connection loss) $\eta_{11}$ of the basic mode, a coupling efficiency (connection loss) $\eta_{22}$ of a higher-order mode, and a coupling efficiency (crosstalk) $\eta_{12}$ and $\eta_{21}$ between modes from the transmittance T by using the following Equations:

$$\eta_{11} = \sqrt{T} = \exp\left(-\frac{d^2}{w^2}\right) \quad [\text{Math. C1}]$$

$$\eta_{12} = \eta_{21} = \frac{d^2}{w^2}\exp\left(-\frac{d^2}{w^2}\right) \quad [\text{Math. C2}]$$

$$\eta_{22} = \left(1 - \frac{d^2}{w^2} + \frac{1}{2}\frac{d^4}{w^4}\right)\exp\left(-\frac{d^2}{w^2}\right) \quad [\text{Math. C3}]$$

where d is an axial deviation amount of the few-mode fiber at the connection point and w is a mode field radius of the few-mode fiber at the connection point.

2. The few-mode fiber testing method according to claim 1,
   wherein, when measuring the intensity distribution, a Brillouin frequency shift in which a Brillouin gain coefficient between the basic modes becomes larger than other Brillouin gain coefficients is used.

3. The few-mode fiber testing method according to claim 1,
   wherein, when calculating the ratio, the ratio is expressed as d/w, the square root of the transmittance obtained from the measured intensity distribution is substituted into the left side of an approximate expression (C1) of a coupling efficiency $\eta_{11}$ between the basic modes at the connection point obtained by approximating an electric field distribution of the basic modes by a Gaussian function, and the ratio d/w is calculated.

$$\eta_{11} = \sqrt{T} = \exp\left(-\frac{d^2}{w^2}\right). \quad [\text{Math. C1}]$$

4. The few-mode fiber testing method according to claim 3,
   wherein, after calculating the ratio d/w, by substituting the ratio d/w into an approximate expression (C3) of a coupling efficiency $\eta_{22}$ between the higher-order modes at the connection point obtained by approximating the electric field distribution of the higher-order mode with a higher-order Gaussian function and an approximate expression (C2) of coupling efficiencies $\eta_{12}$ and $\eta_{21}$ between the basic mode and the higher-order mode, the connection loss $\eta 22$ in the higher-order mode and inter-mode crosstalk $\eta_{12}$ and $\eta_{21}$ between different modes are calculated.

$$\eta_{12} = \eta_{21} = \frac{d^2}{w^2}\exp\left(-\frac{d^2}{w^2}\right) \quad [\text{Math. C2}]$$

$$\eta_{22} = \left(1 - \frac{d^2}{w^2} + \frac{1}{2}\frac{d^4}{w^4}\right)\exp\left(-\frac{d^2}{w^2}\right). \quad [\text{Math. C3}]$$

5. A few-mode fiber testing device comprising:
   a Brillouin optical time domain reflectometry device connected to one end of an optical fiber under test in which few-mode fibers of the same kind are connected in series and which inputs a test light pulse from the one end in a basic mode and configured to measure an intensity distribution related to a distance from the one end of backward Brillouin scattering light of the basic mode generated by the test light pulse;

a processor; and a storage medium having computer program instructions stored thereon, when executed by the processor, perform to:

calculate a ratio of an intensity $P_{b1}$ of backward Brillouin scattering light at a connection point seen from one end side of the optical fiber under test to an intensity $P_{b2}$ of backward Brillouin scattering light at the connection point seen from another end side of the optical fiber under test, set the ratio as a transmittance T at the connection point of the few-mode fiber, and calculate a coupling efficiency (connection loss) nu of the basic mode, a coupling efficiency (connection loss) $\eta_{22}$ of a higher-order mode, and a coupling efficiency (crosstalk) $\eta_{12}$ and $\eta_{21}$ between modes from the transmittance T by using the following Equations:

$$\eta_{11} = \sqrt{T} = \exp\left(-\frac{d^2}{w^2}\right) \qquad [\text{Math. C1}]$$

$$\eta_{12} = \eta_{21} = \frac{d^2}{w^2}\exp\left(-\frac{d^2}{w^2}\right) \qquad [\text{Math. C2}]$$

$$\eta_{22} = \left(1 - \frac{d^2}{w^2} + \frac{1}{2}\frac{d^4}{w^4}\right)\exp\left(-\frac{d^2}{w^2}\right) \qquad [\text{Math. C3}]$$

where d is an axial deviation amount of the few-mode fiber at the connection point and w is a mode field radius of the few-mode fiber at the connection point.

* * * * *